(12) United States Patent
Fang et al.

(10) Patent No.: US 11,637,643 B2
(45) Date of Patent: Apr. 25, 2023

(54) MACHINE LEARNING-BASED LINK ADAPTATION

(71) Applicant: Intel Corporation, Santa Clara, CA (US)

(72) Inventors: Xiaoran Fang, Shanghai (CN); Matthew Hayes, Radebeul (DE); John P. Hogan, San Jose, CA (US); Shoujiang Ma, Shanghai (CN); Mehrzad Malmirchegini, San Jose, CA (US); Rongzhen Yang, Shanghai (CN); Hujun Yin, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 125 days.

(21) Appl. No.: 17/252,976

(22) PCT Filed: Sep. 28, 2018

(86) PCT No.: PCT/CN2018/108327
§ 371 (c)(1),
(2) Date: Dec. 16, 2020

(87) PCT Pub. No.: WO2020/062022
PCT Pub. Date: Apr. 2, 2020

(65) Prior Publication Data
US 2021/0218483 A1 Jul. 15, 2021

(51) Int. Cl.
*H04B 17/336* (2015.01)
*H04L 1/00* (2006.01)
*H04W 24/08* (2009.01)

(52) U.S. Cl.
CPC ......... *H04B 17/336* (2015.01); *H04L 1/0041* (2013.01); *H04W 24/08* (2013.01)

(58) Field of Classification Search
CPC ..... H04B 17/336; H04L 1/0041; H04W 24/08
See application file for complete search history.

(56) References Cited

U.S. PATENT DOCUMENTS

2008/0132281 A1   6/2008  Kim et al.
2018/0365975 A1*  12/2018 Xu .................... G08B 13/08

FOREIGN PATENT DOCUMENTS

| CN | 102282783 A | 12/2011 |
| CN | 102611666 A | 7/2012 |
| CN | 108462517 A | 8/2018 |

OTHER PUBLICATIONS

Abdulhasan et al., "A Channel Quality Indicator (CQI) Prediction Scheme Using Feed Forward Neural Network (FF-NN) technique for MU-MIMO LTE System", Nov. 24-26, 2014, IEEE. (Year: 2014).*

(Continued)

*Primary Examiner* — Peter P Chau
(74) *Attorney, Agent, or Firm* — Schwegman Lundberg & Woessner, P.A.

(57) ABSTRACT

Aspects for machine learning-based link adaptation are described. For example, an apparatus can determine k-nearest neighbors (K-NNs) based on training data associated with the sub-band and on the signal to interference and noise ratio (SINR) of the sub-band. In aspects, the apparatus can identify a channel quality indicator (CQI) associated with the lowest error rate for the k-NNs and provide the identified CQI to a base station. In aspects, a neural network (NN) can provide labels for CQIs that indicate probability of choosing a CQI, and the CQI having highest probability will be provided to a base station. In aspects, a covariance matrix based on samples of a communication channel can be provided to a NN to determine a rank indicator (RI) corresponding to the channel, and channel state information (Continued)

associated with the (RI) can be sent to the base station. Other aspects are described.

9 Claims, 14 Drawing Sheets

(56) References Cited

OTHER PUBLICATIONS

Dong et al., "Machine Learning Based Link Adaptation Method for MIMO System", Sep. 9-12, 2018, IEEE. (Year: 2018).*
"International Application Serial No. PCT/CN2018/108327, International Search Report dated Jun. 28, 2019", 3 pgs.
"International Application Serial No. PCT/CN2018/108327, Written Opinion dated Jun. 28, 2019", 4 pgs.
Halil, "Adaptation Using Neural Network in Frequency Selective MIMO-OFDM Systems", IEEE 5th International Symposium on Wireless Pervasive Computing 2010, (May 7, 2010), 390-394.

* cited by examiner

MACHINE LEARNING-BASED LINK ADAPTATION

This application is a U.S. National Stage Filing under 35 U.S.C. 371 from International Application No. PCT/CN2018/108327, filed Sep. 18, 2018 and published in English as WO 2020/062022 on Apr. 2, 2020, which is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including new radio (NR) networks. Other aspects are directed to techniques, methods and apparatuses for link adaptation using machine learning.

BACKGROUND

Link adaptation is used in wireless communication systems to match the modulation, coding, and other signal and protocol parameters to conditions, such as pathloss, interference, etc., on the radio link. Link adaptation relies on feedback between user systems and base stations. Current systems for providing and processing this feedback rely on computationally-expensive algorithms. Accordingly, there is a general need to improve speed and efficiency of link adaptation in wireless communication systems.

BRIEF DESCRIPTION OF THE DRAWINGS

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

Figure 1:
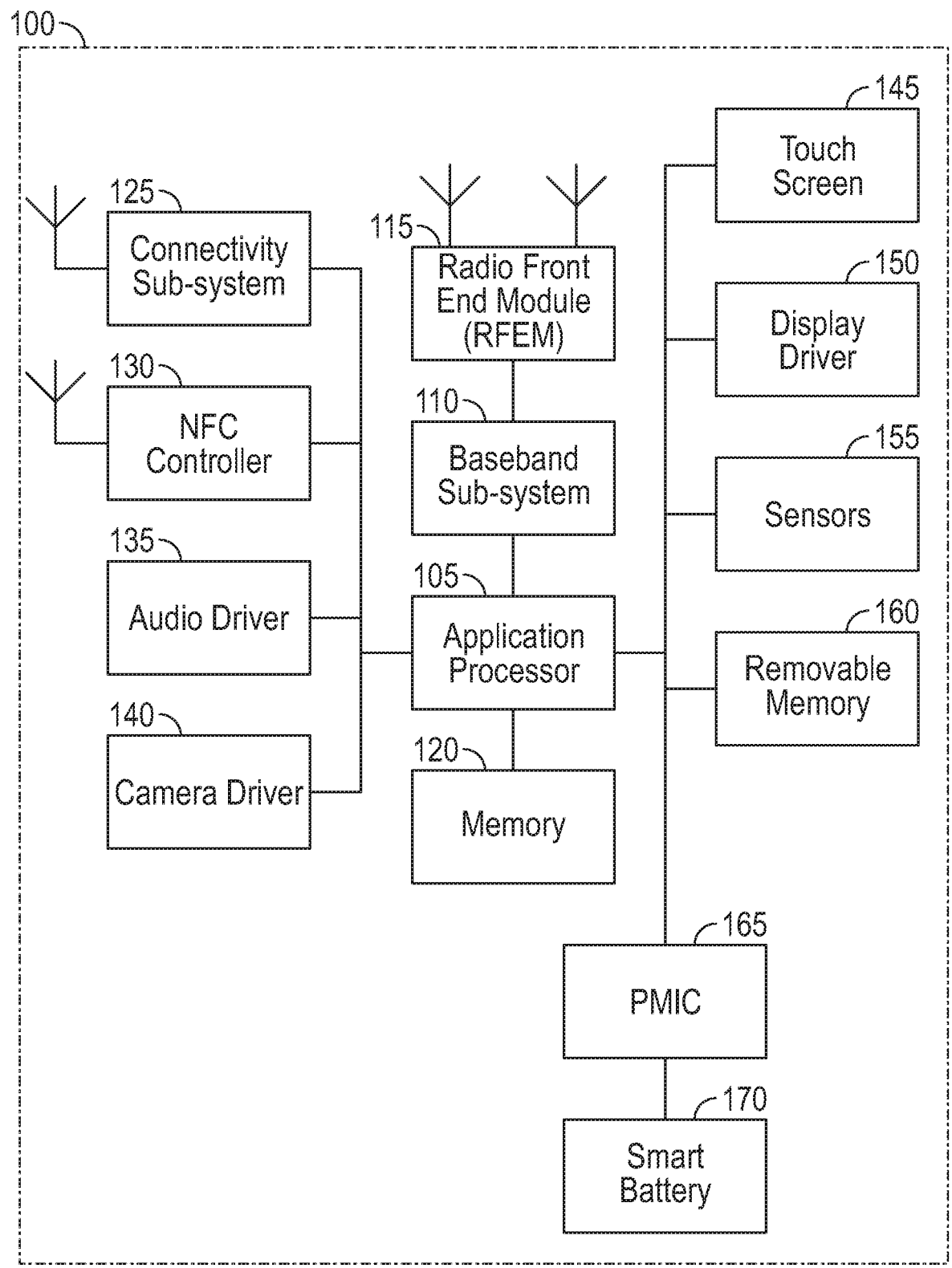
FIG. 1 illustrates an exemplary user device according to some aspects.

FIG. 1 illustrates an exemplary user device according to some aspects. The user device 100, in some aspects, may be configured for providing feedback values used for link adaptation as described later herein. Link adaptation may also be referred to as adaptive modulation and coding (AMC). The user device 100 may be a mobile device in some aspects and includes an application processor 105, baseband processor 110 (also referred to as a baseband sub-system), radio front end module (RFEM) 115, memory 120, connectivity sub-system 125, near field communication (NFC) controller 130, audio driver 135, camera driver 140, touch screen 145, display driver 150, sensors 155, removable memory 160, power management integrated circuit (PMIC) 165, and smart battery 170.

In some aspects, application processor 105 may include, for example, one or more central processing unit (CPU) cores and one or more of cache memory, low drop-out voltage regulators (LDOs), interrupt controllers, serial interfaces such as SPI, I2C or universal programmable serial interface sub-system, real time clock (RTC), timer-counters including interval and watchdog timers, general purpose IO, memory card controllers such as SD/MMC or similar, USB interfaces, MIPI interfaces, and/or Joint Test Access Group (JTAG) test access ports.

In some aspects, baseband processor 110 may be implemented, for example, as a solder-down substrate including one or more integrated circuits, a single packaged integrated circuit soldered to a main circuit board, and/or a multi-chip module including two or more integrated circuits.

Figure 2:
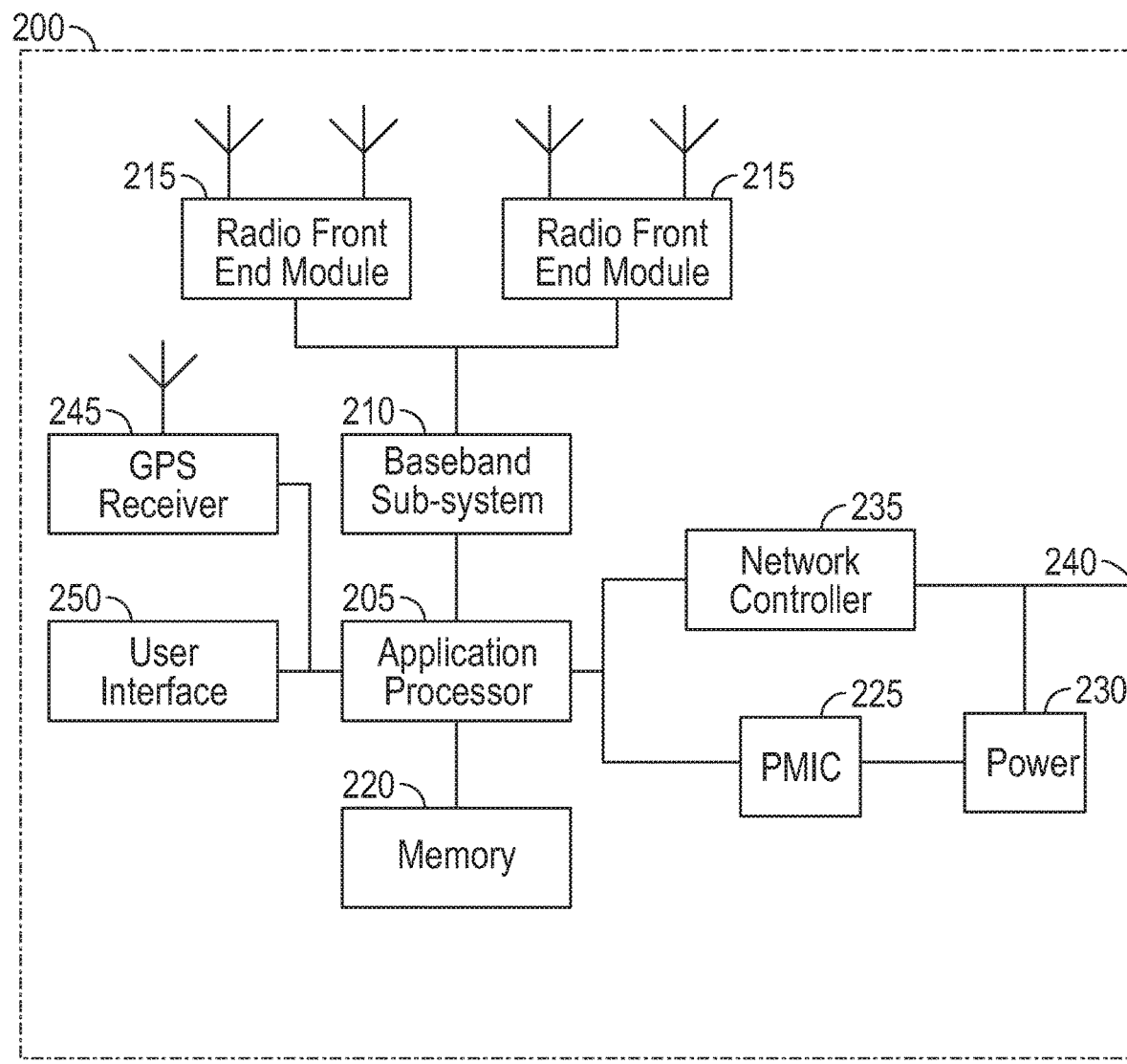
FIG. 2 illustrates an exemplary base station radio head according to some aspects.

FIG. 2 illustrates an exemplary base station or infrastructure equipment radio head according to some aspects. A base station may be termed, for example, an Evolved Node-B (eNB, eNodeB), or a New Radio Node-B (gNB, gNodeB). The base station radio head 200, in some aspects, may be configured for link adaptation, as discussed in more detail below. In some aspects, the base station radio head 200 may include one or more of application processor 205, baseband processors 210, one or more radio front end modules 215, memory 220, power management integrated circuitry (PMIC) 225, power tee circuitry 230, network controller 235, network interface connector 240, satellite navigation receiver (e.g., GPS receiver) 245, and user interface 250.

In some aspects, application processor 205 may include one or more CPU cores and one or more of cache memory, low drop-out voltage regulators (LDOs), interrupt controllers, serial interfaces such as SPI, I2C or universal programmable serial interface, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 210 may be implemented, for example, as a solder-down substrate including one or more integrated circuits, a single packaged integrated circuit soldered to a main circuit board or a multi-chip sub-system including two or more integrated circuits.

In some aspects, memory 220 may include one or more of volatile memory including dynamic random access memory (DRAM) and/or synchronous DRAM (SDRAM), and non-volatile memory (NVM) including high-speed electrically erasable memory (commonly referred to as Flash memory), phase-change random access memory (PRAM), magneto-resistive random access memory (MRAM), and/or a three-dimensional cross point memory. Memory 220 may be implemented as one or more of solder down packaged integrated circuits, socketed memory modules and plug-in memory cards.

In some aspects, power management integrated circuitry 225 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 230 may provide for electrical power drawn from a network cable. Power tee circuitry 230 may provide both power supply and data connectivity to the base station radio head 200 using a single cable.

In some aspects, network controller 235 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver 245 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 245 may provide, to application processor 205, data which may include one or more of position data or time data. Time data may be used by application processor 205 to synchronize operations with other radio base stations or infrastructure equipment.

In some aspects, user interface 250 may include one or more of buttons. The buttons may include a reset button. User interface 250 may also include one or more indicators such as LEDs and a display screen.

Figure 3:
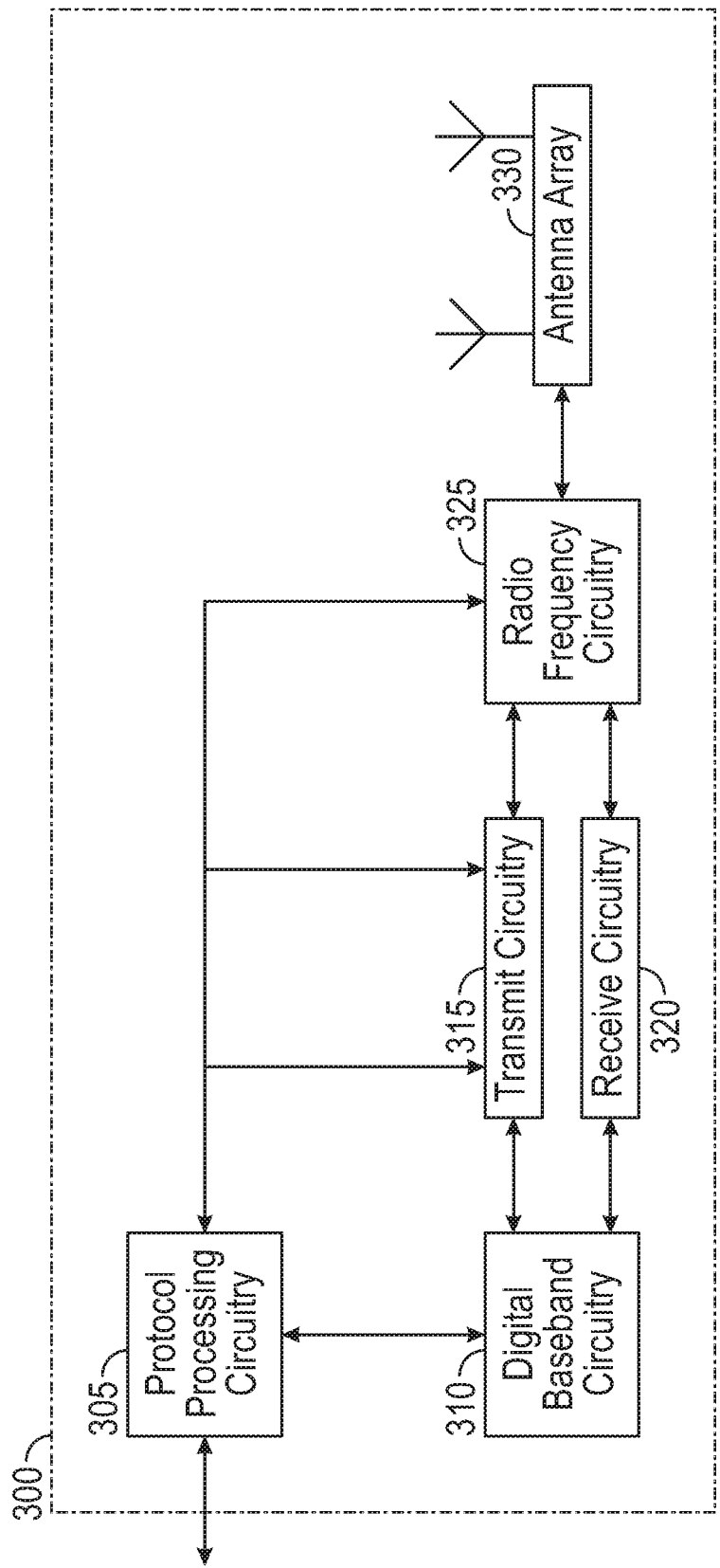
FIG. 3 illustrates exemplary communication circuitry according to some aspects.

FIG. 3 illustrates exemplary communication circuitry according to some aspects. Communication circuitry 300 shown in FIG. 3 may be alternatively grouped according to functions. Components illustrated in FIG. 3 are provided here for illustrative purposes and may include other components not shown in FIG. 3.

Communication circuitry 300 may include protocol processing circuitry 305 (or processor) or other means for processing. Protocol processing circuitry 305 may implement one or more of medium access control (MAC), radio link control (RLC), packet data convergence protocol (PDCP), radio resource control (RRC) and non-access stratum (NAS) functions, among others. Protocol processing circuitry 305 may include one or more processing cores to execute instructions and one or more memory structures to store program and data information.

Communication circuitry 300 may further include digital baseband circuitry 310. Digital baseband circuitry 310 may implement physical layer (PHY) functions including one or more of hybrid automatic repeat request (HARM) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, link adaptation, and other related functions.

Communication circuitry 300 may further include transmit circuitry 315, receive circuitry 320 and/or antenna array circuitry 330. Communication circuitry 300 may further include RF circuitry 325. In some aspects, RF circuitry 325 may include one or multiple parallel RF chains for transmission and/or reception. Each of the RF chains may be connected to one or more antennas of antenna array circuitry 330.

In some aspects, protocol processing circuitry 305 may include one or more instances of control circuitry. The control circuitry may provide control functions for one or more of digital baseband circuitry 310, transmit circuitry 315, receive circuitry 320, and/or RF circuitry 325.

Figure 4:
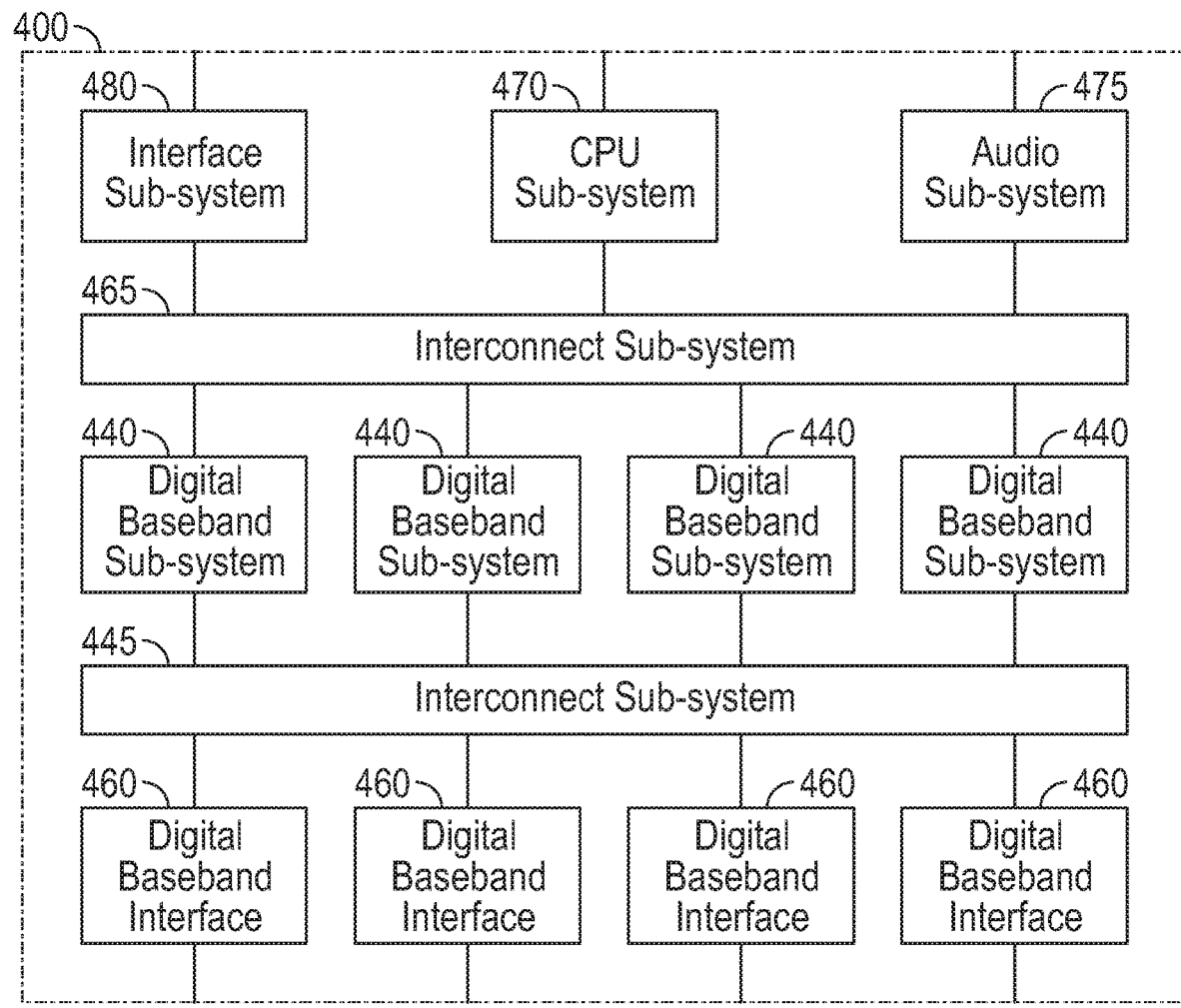
FIG. 4 illustrates an exemplary multi-protocol baseband processor useable in FIG. 1 or FIG. 2, according to some aspects.

FIG. 4 illustrates a multi-protocol baseband processor 400 useable in the system and circuitry shown in FIG. 1 or FIG. 2, according to some aspects. In an aspect, baseband processor may contain one or more digital baseband subsystems referred to collectively as digital baseband subsystems 440.

In an aspect, the one or more digital baseband subsystems 440 may be coupled via interconnect subsystem 465 to one or more of CPU subsystem 470, audio subsystem 475 and interface subsystem 480. In an aspect, the one or more digital baseband subsystems 440 may be coupled via interconnect subsystem 445 to one or more of each of digital baseband interface 460 and mixed-signal baseband subsystem 435.

In an aspect, interconnect subsystem 465 and 445 may each include one or more of each of buses point-to-point connections and network-on-chip (NOC) structures. In an aspect, audio subsystem 475 may include one or more of digital signal processing circuitry, buffer memory, program memory, speech processing accelerator circuitry, data converter circuitry such as analog-to-digital and digital-to-analog converter circuitry, and analog circuitry including one or more of amplifiers and filters. In an aspect, interconnect subsystem 465 and 445 may each include one or more of each of buses point-to-point connections and network-on-chip (NOC) structures.

Machine Learning-Based Link Adaptation

Machine learning can be implemented in any of the above systems to improve network efficiency and throughput. For example, link adaptation can be implemented using machine learning methods. Aspects provide baseband architecture to support machine learning algorithms. In some aspects, a k-Nearest Neighbor (k-NN) algorithm is implemented for LTE physical downlink shared channel (PDSCH) link adaptation that is based on user equipment (UE) CQI feedback. Other aspects provide architectures for implementing neural networks (NN), for example deep NN (DNN). Still other aspects provide adaptation based on channel covariance matrices.

k-Nearest Neighbor-Based Link Adaptation

3GPP LTE link adaptation processes are based on CQI feedback, and in these processes, a base station uses CQI reporting from UEs to determine the modulation coding scheme (MCS) that will be used for further communications. CQI represents the quality of the channel by providing a quality estimation based on a post-signal-to-noise ratio (SINR) value of a resource block of downlink transmissions.

Figure 5:
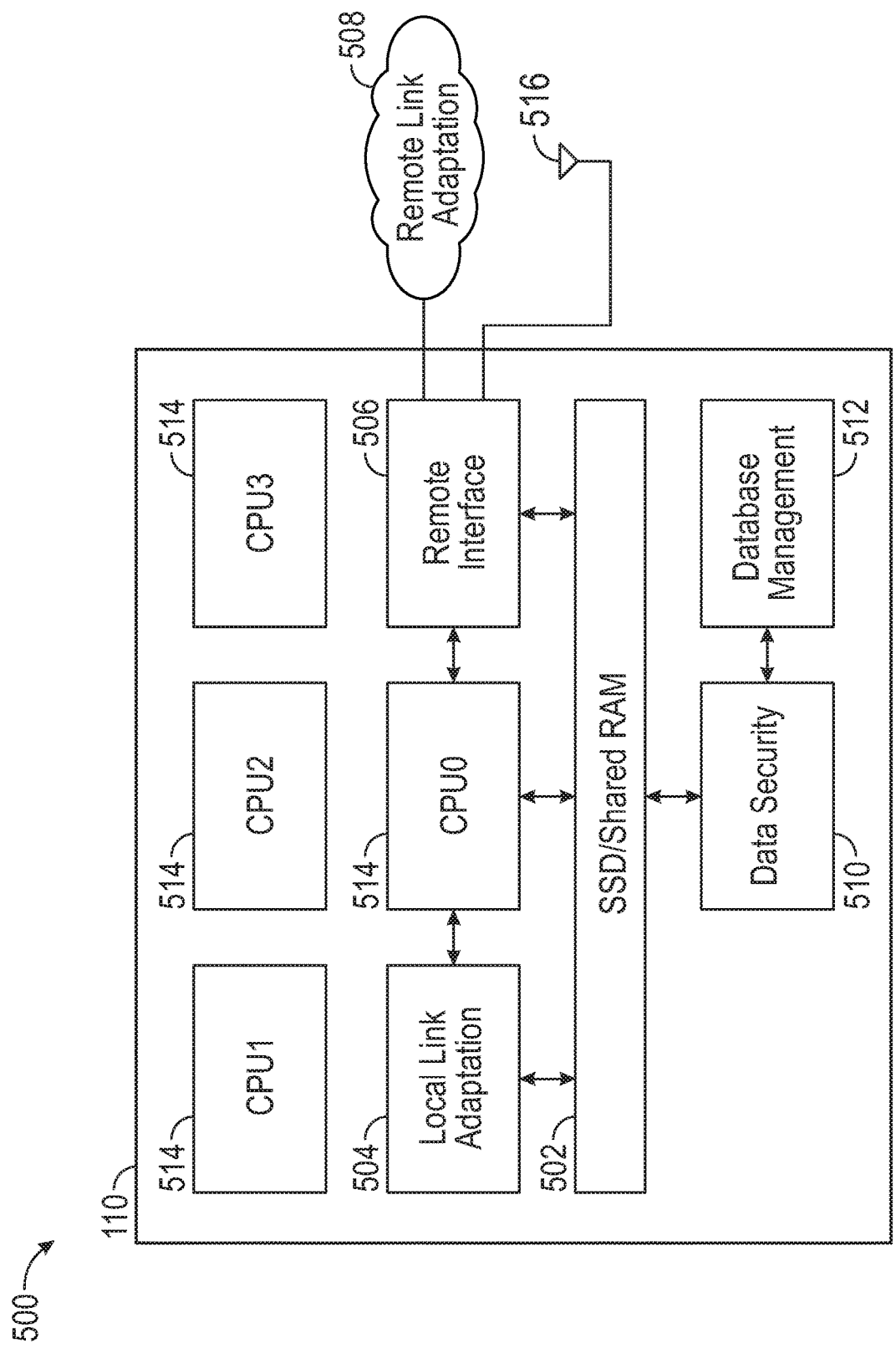
FIG. 5 illustrates an architecture of the user device baseband chipset upon which the user device can implement link adaptation according to some aspects.

Methods according to aspects perform link adaptation by implementing machine-learning algorithms in, for example, the baseband sub-system 110 the user device 100 illustrated in FIG. 1. FIG. 5 illustrates an architecture 500 of the user device baseband chipset upon which the user device can implement link adaptation according to some aspects.

The architecture 500 can include solid-state drive (SSD) or shared RAM 502, which provides storage for databases relevant for machine learning according to aspects. In some aspects, link status information can be stored in SSD or shared RAM 502. Such link status information can include, for example, sub-band post-SINR, packet cyclic redundancy check (CRC) results, traffic block sizes, etc. Feedback CQI values can also be stored in SSD or shared RAM 502, and these and other values can be stored for later processing to provide data statistics.

The architecture 500 can further include Local Link Adaptation (LLA) circuitry 504. LLA circuitry 504 can retrieve or access link adaptation training data from SSD/Shared RAM 502, to perform machine learning-based training and link adaptation. The architecture 500 can further include Remote Link Adaptation (RLA) interface circuitry 506 that can access RLA circuitry 508. RLA circuitry 508 can be located in a remote server. The RLA circuitry 508 can access training data stored in SSD/Shared RAM 502 through the RLA interface circuitry 506. The RLA circuitry 508 can access larger quantities of training information (relative to LLA circuitry 504) to generate precise classification results, with a tradeoff in higher latency (relative to LLA circuitry 504).

The architecture 500 can further include data security circuitry 510 for data protection, and database management circuitry 512 that can access data using security protocols. CPUs 514 can implement machine-learning algorithms using any of the data and protocols provided in other components of the architecture 500, according to aspects described herein. CPUs 514 can be components of, for example, CPU subsystem 470 (FIG. 4). Connectivity can be provided over antenna/s 516.

Figure 6:
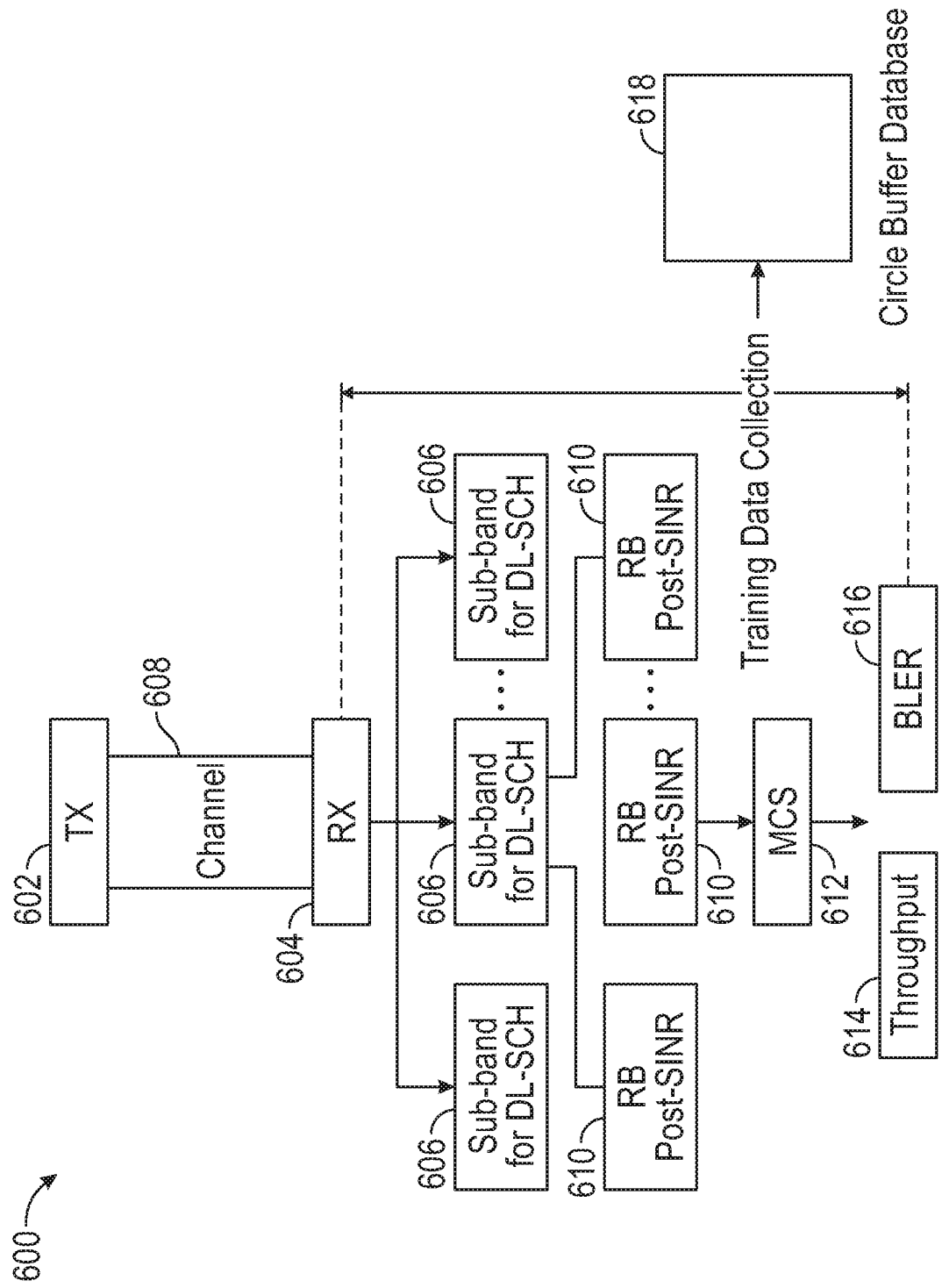
FIG. 6 illustrates a procedure for training data collection according to some aspects.

Machine learning algorithms are provided with, and use, training data to predict future outputs for new inputs that were not part of the training set. FIG. 6 illustrates a procedure 600 for training data collection according to some aspects. After the transmission data burst allocation and signal generation 602, the user device 100 (FIG. 1) can use receive circuitry 320 (FIG. 3) to receive 604 signals on a plurality of sub-bands 606 through channel propagation 608. The signals can include downlink shared channels (DL-SCH) although aspects are not limited thereto.

User device 100 circuitry (e.g., baseband processor 110) can calculate a SINR of a specified sub-band of the plurality of sub-bands 606 at blocks 610. When the training process is complete, the user device 100 may have calculated all, or a subset of all, of the post-SINR for each sub-band or resource block (RB) thereof. In some available systems, Mutual Information Effective SNR Mapping (MIESM) can be used to generate the effective SINR for CQI mapping. Then, the best-M method is used to filter the sub-band with best channel status to provide a best MCS at block 612. Throughput 614 and block error rate (BLER) 616 are obtained using traffic buffer size and CRC results, respectively. Values provided at blocks 610, 612, 614 and 616 are provided as training data for storage in a database 618 (e.g.,  a circle buffer database). In some aspects, training data can include a previous SINR for each sub-band, a previous error result for each sub-band, traffic block size/s, associated MCS/s, and BLER/s.

Figure 7:
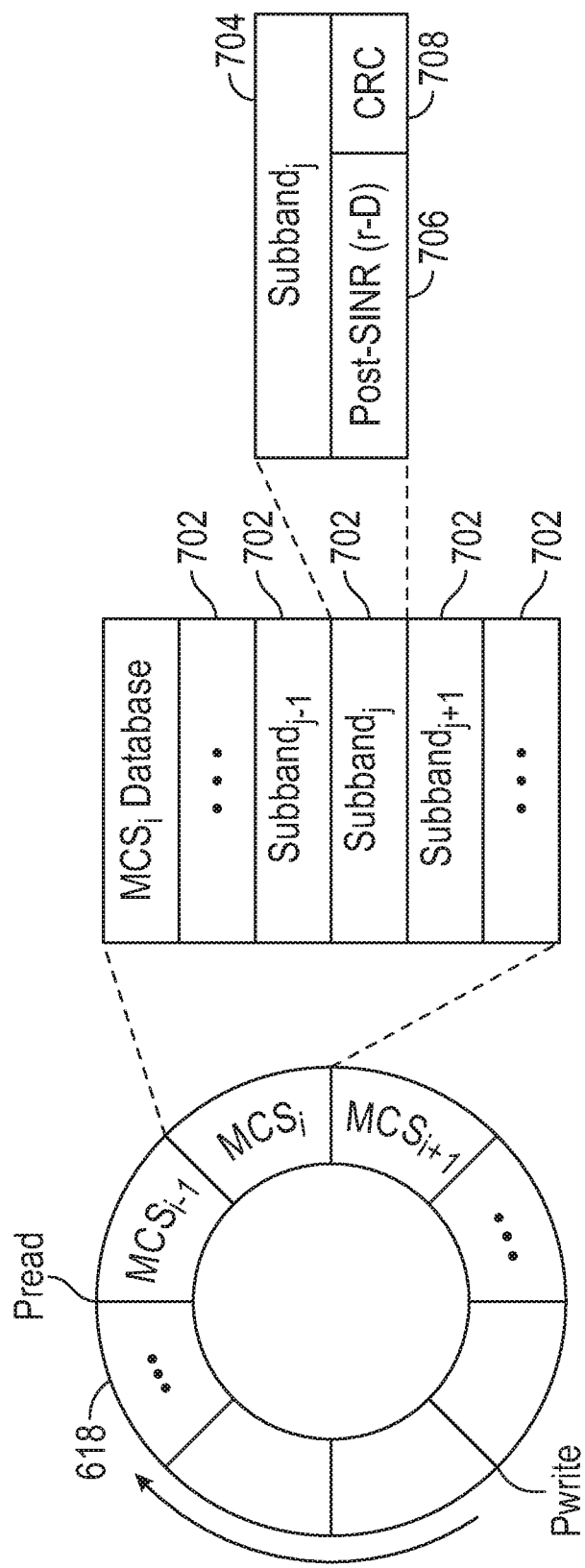
FIG. 7 illustrates fields of a circle buffer database according to some aspects.

FIG. 7 illustrates fields of the circle buffer database 618 according to some aspects. For each MCS, the database 618 stores information 702 for a plurality of sub-bands. Data 704 for each sub-band includes at least of r-dimensional ordered post-SINR 706, where r is determined by the number of RBs used (and is related to system bandwidth). The CRC calibration result 708 is used to verify that the packet error rate (PER) is below a threshold, e.g., below about 10% although aspects are not limited thereto.

Link adaptation (also referred to as AMC) is the process of selecting a CQI value, corresponding to the quadrature amplitude modulation (QAM) order and payload bit number, that maximizes throughput under a reliability constraint for different realizations of the channel state. A link adaptation process classifies a set of SINRs to find the favorable value of CQI to maximize throughput. MIESM as described above is commonly used to calculate the feedback CQI value based on estimated noise. Such MIESM-based algorithms can be inaccurate. Methods according to aspects can improve performance of the MIESM method. Aspects utilize k-NN-based algorithms because k-NN algorithms can provide accurate class estimates without knowledge of a functional mapping between the feature sets and the class.

Figure 8:
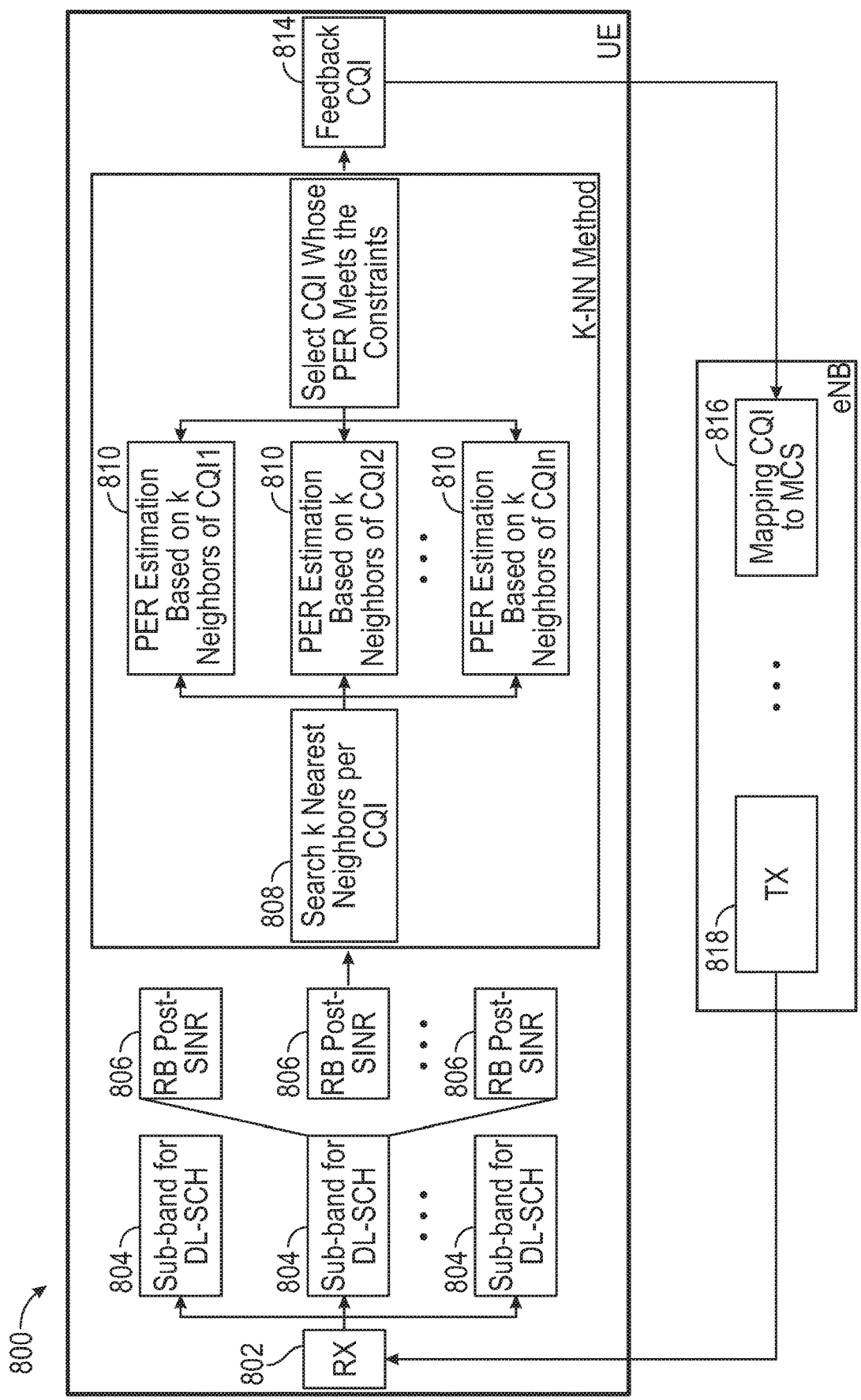
FIG. 8 illustrates a k-NN-based method for link adaptation according to some aspects.

FIG. 8 illustrates a k-NN-based method 800 for link adaptation according to some aspects. The method 800 can be executed periodically, or upon receiving a signal, or upon detecting signal deterioration, or upon any other request or signaling. In the k-NN based method 800, the feature space is selected to be the post-SINRs for all RBs in a received sub-band. However, it will be appreciated by one of ordinary skill that other feature spaces could be chosen instead. For example, any feature representative of channel conditions can be used, such as post-SINR of all sub-carriers in the sub-band, etc. In implementations according some aspects, a DL-SCH can include fifty RBs, while each sub-band includes six RBs (making the feature space 6-dimensional). However, link adaptation can be implemented using other sizes of channels and sub-bands. For each set of RB post-SINR, the selected CQI and corresponding CRC result are recorded as a label in, for example, SSD/Shared RAM 502 (FIG. 5) or other storage. SSD/Shared RAM 502 can also store other CQI-related data, including feedback CQIs (and corresponding CRCs) selected by other methods (e.g., MIESM methods described above).

At block 802, the user device 100 receives signals on a plurality of sub-bands 804 at receive circuitry 320 (FIG. 3). At blocks 806, baseband processor 110 (FIG. 1) calculates (or accesses in memory or otherwise obtains) post-SINR for specified sub-bands of the plurality of sub-bands. In some examples, the SINR is calculated for each RB of the specified sub-band, and in turn for each sub-band of the plurality of sub-bands. At block 808, the baseband processor 110 determines k-NN based on training data associated with the sub-band and on the calculated SINR. In some aspects, the baseband processor 110 may sort the SINR values of the RBs in descending order and determines the k-NN based on the sorted SINR values. In some aspects, Euclidean distance is used to determine nearness, although aspects are not limited thereto.

At blocks 810, the baseband processor 110 determines error rates for the k-NNs to determine a lowest error rate for the k-NNs. As described earlier herein, the error rates can comprise PERs estimated based on CRC results. At block 812, the baseband processor 110 identifies a CQI associated with the lowest error rate determined at blocks 810. In some aspects, a CQI can be selected whose PER estimation meets constraints, for example, a largest CQI can be selected whose PER is lower than a threshold (e.g., 10%). In some aspects, the baseband processor 110 sets CQI to "1" sequentially searches all CQIs to identify a CQI associated with the lowest error rate. In other aspects, alternative searching methods such as binary search are used, or previously-used CQIs can be searched.

Figure 9:
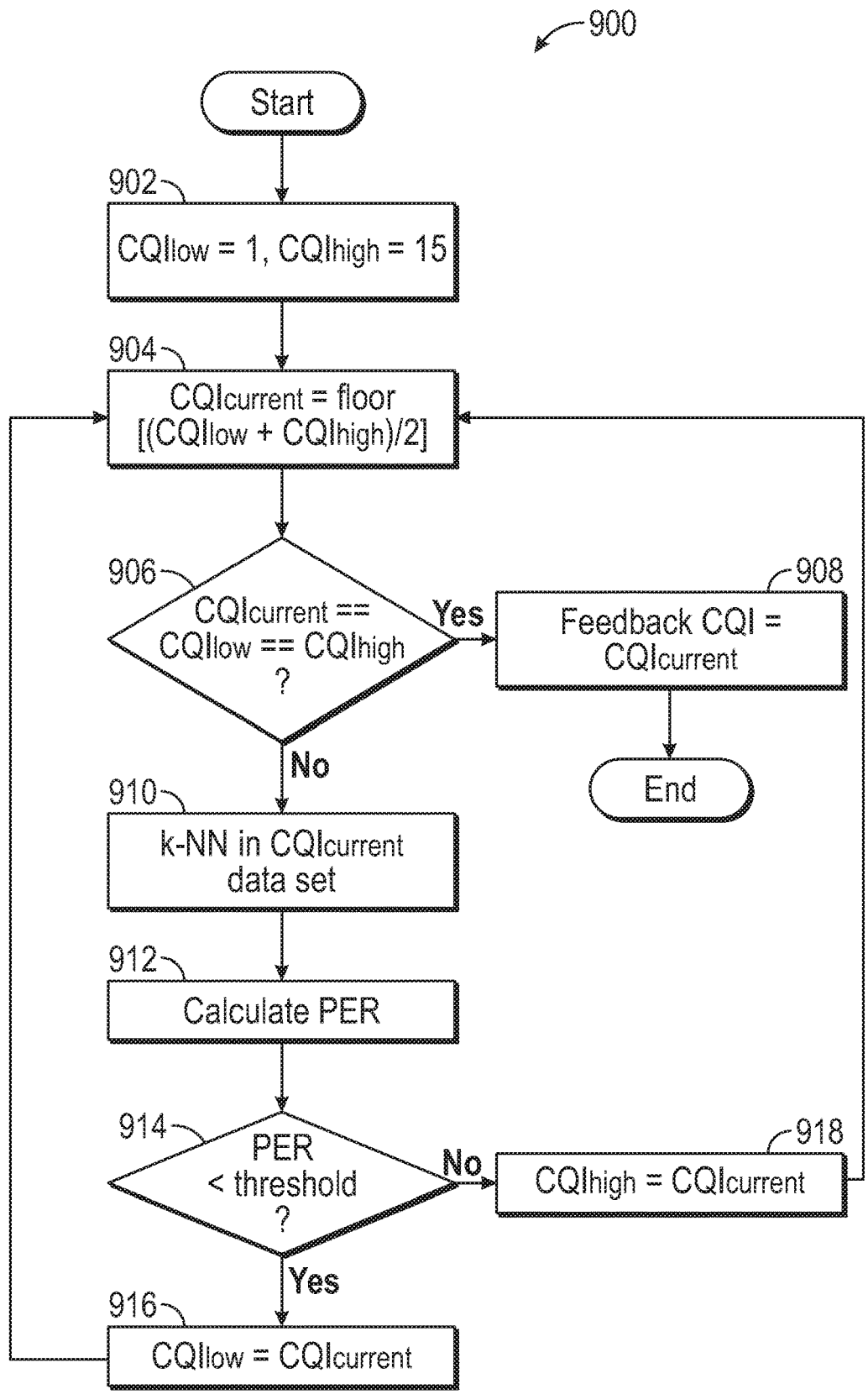
FIG. 9 illustrates a method for using binary search to identify a CQI associated with the lowest error rate according to some aspects.

FIG. 9 illustrates a method 900 for using binary search to identify a CQI associated with the lowest error rate according to some aspects. Binary search can reduce search complexity from O(n) to O(log n).

In operation 902, the baseband processor 110 sets $CQI_{low}$ to 1 and $CQI_{high}$ to 15. These values are set based on wireless communication standards, for example, 3GPP Technical Specification (TS) 36.213, which specifies the maximum number ($\eta_{CQI}$) of CQI values available. According to current versions of TS 36.213, $\eta_{CQI}$ is 15 but it will be understood that higher numbers may become available, or $CQI_{low}$ and $CQI_{high}$ may be set to other numbers besides 1 and 15 in some aspects.

In operation 904, the baseband processor 110 sets $CQI_{current}=floor \lfloor (CQI_{low}+CQI_{high})/2 \rfloor$. In operation 906, the baseband processor 110 determines whether $CQI_{current}$, $CQI_{low}$ and $CQI_{high}$ are all equal and, if the answer is yes, $CQI_{current}$ is provided as the feedback CQI in operation 908. Otherwise, in operation 910, the baseband processor 110 finds k-NN of $CQI_{current}$ and then calculates the PER in operation 912. If the PER is less than a threshold, as determined in operation 914, then in operation 916, $CQI_{low}$ is set to COI current Otherwise, in operation 918, $CQI_{high}$ is set to $CQI_{current}$ In any case, whether operation 916 or 918 is conducted, the baseband processor 110 repeats operations 904, 906, 910, 912, 914, 916 and 918 until $CQI_{current}$ $CQI_{low}$ and $CQI_{high}$ are all equal at which time $CQI_{current}$ is provided as the feedback CQI in operation 908.

Figure 10:
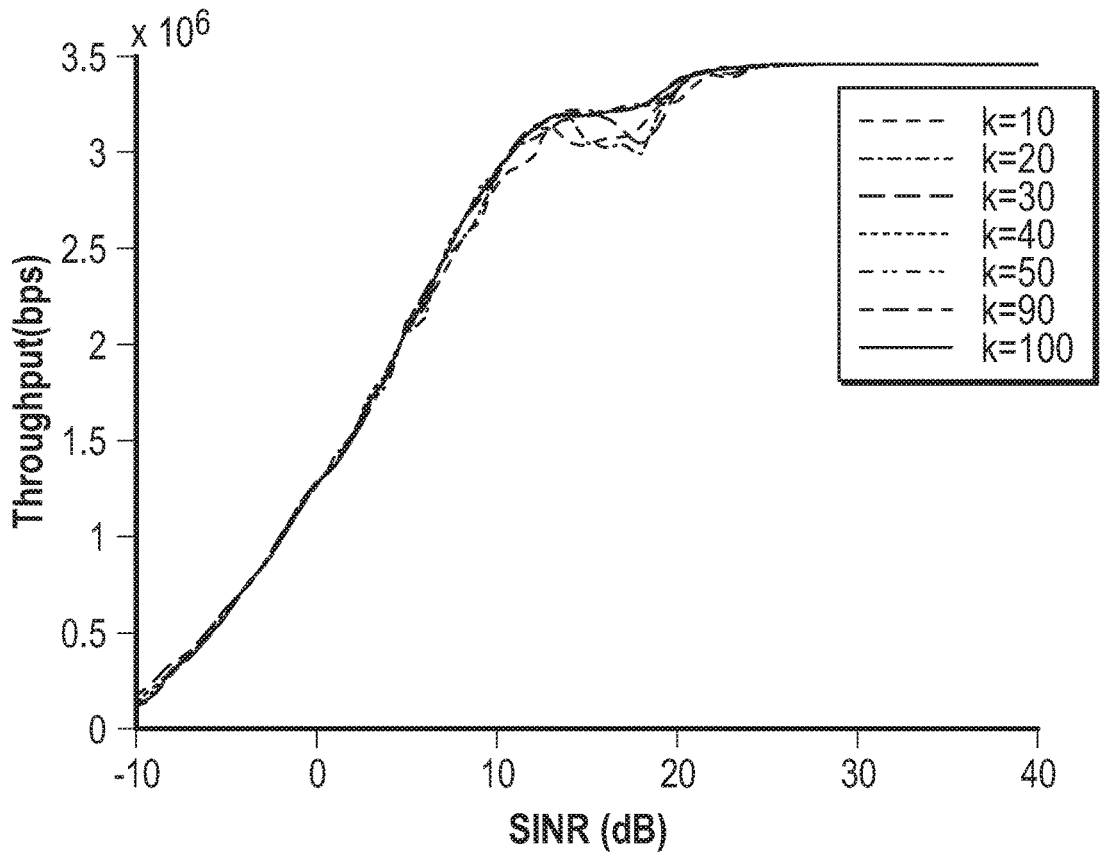
FIG. 10 illustrates throughput for different values of k used in k-NN-based methods according to some aspects.

Efficiency and speed of the link adaptation process and system throughput can be improved through selection of a proper value for k to be used in operation 810 (FIG. 8) and operation 910 (FIG. 9) or similar operations for searching for k-NNs. In one aspect, k can be set at a large fixed value to provide improved throughput. In another aspect, k can be set to different values depending on the input SINR (e.g., SINRs as input at operation 806 (FIG. 8)). For example, k can be set to larger values where it has been previously determined that throughput curves vary significantly with different k values. By way of illustration, in FIG. 10, the input SINR from 5 to 25 dB was a critical area in which the throughput curves of different k values performed differently. Accordingly, in one aspect, k values could be set according to the below, based on input SINR:

$$k = \begin{cases} 100, & 5 \leq SINR < 25 \\ 10, & SNR < 5 \text{ or } SINR \geq 25 \end{cases}$$

Figure 11:
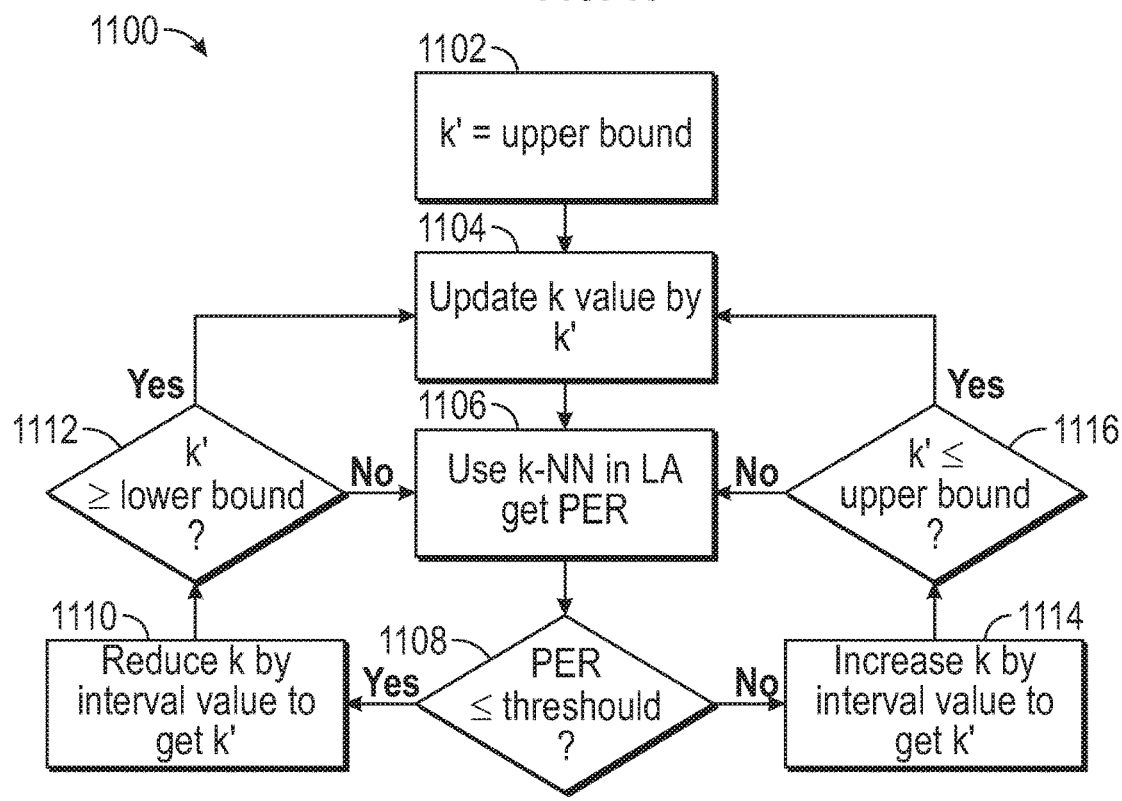
FIG. 11 illustrates a method for setting k based on PER feedback according to some aspects.

As another alternative, k can be set based on PER feedback. FIG. 11 illustrates a method 1100 for setting k based on PER feedback according to some aspects. In operation 1102, k is set to an upper bound value. This value will be used in operation to execute k-NN-based link adaptation methods in operation 1104 to get a corresponding PER in operation 1106. If PER is less than or equal to a threshold, as determined at operation 1108, then k is reduced by a predetermined value in operation 1110 to generate a new k value k'. If k is still above a lower bound as determined in operation 1112, then k is updated to k' and operations 1106 and 1108 repeat. If k is less than the lower bound, then operation 1106 repeats with the original value of k. If PER is greater than the threshold, then k is increased by a predetermined value in operation 1114 to generate a new k value k'. If k' is still below the upper bound, as determined in operation 1116, then k is updated to k' and operations 1106 and 1108 repeat. Otherwise, if k is above the upper bound, the original value of k is used to repeat operation 1106.

Referring again to FIG. 8, at block 814, the baseband processor 110 provides provide the CQI and lowest error rate for transmission (e.g., to transmit circuitry 315 (FIG. 3)) to the base station. At block 816, the base station maps the feedback CQI to an MCS according to 3GPP standards or other family of standards, and then uses that MCS for future downlink transmissions at block 818.

In some aspects, the baseband processor 110 can determine a CRC result based on the SINR value and the k-NNs and determine the error rate based on the CRC result. In some aspects, in response to a determination the error rate is less than a threshold, the baseband processor 110 can update the identified CQI to a current CQI if the current CQI is greater than the identified CQI.

When user devices 100 have implemented method 800, according to aspects, each sub-band of the DL-SCH will have reported a CQI and a corresponding error rate value. The sub-band having the largest CQI will be selected for transmission, and if two or more sub-bands both have the largest CQI, the sub-band with the lowest rate will be selected.

Neural Network-Based Link Adaptation

In some aspects, post-SINR values (such as those provided, calculated or determined at blocks 806 (FIG. 8)) are used as inputs to a neural network (NN). The baseband processor 110 performs preprocessing by, for example, labeling appropriate CQIs on post-SINR values before the post-SINR values are input to the NN. This preprocessing can be performed according to a method described with respect to FIG. 12. The NN output includes the selected CQI index (similar to that provided in block 814 (FIG. 8)).

Figure 12:
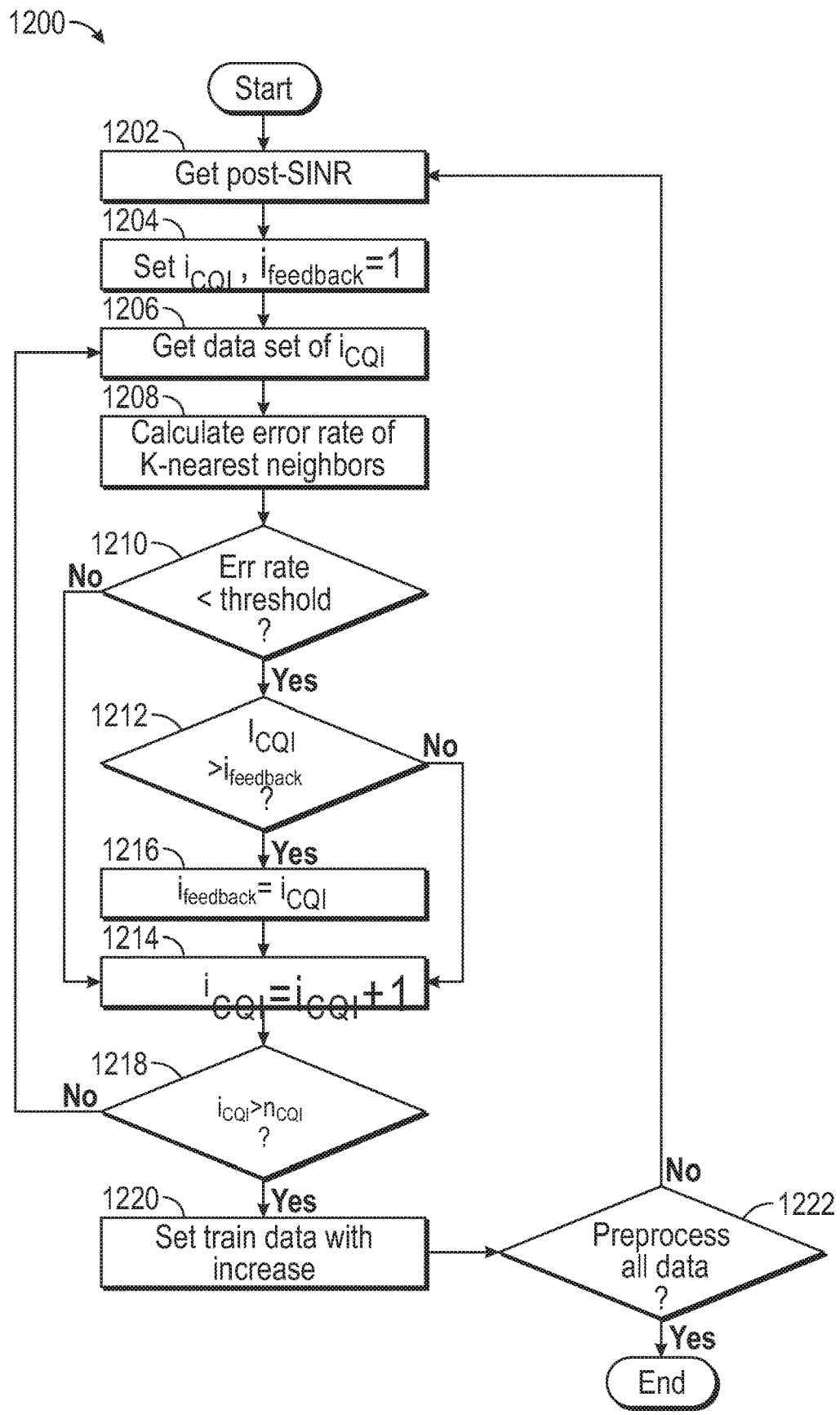
FIG. 12 illustrates a method of training data preprocessing according to some aspects.

FIG. 12 illustrates a method 1200 of training data preprocessing according to some aspects. As a result of performing method 1200, the baseband processor 110 (FIG. 1) will have labeled CQI on post-SINRs of training data (e.g., of signals received at receive circuitry 320 (FIG. 3)). Before the labeling of method 1200 occurs, the user device 100 (FIG. 1) receives signals on a plurality of sub-bands 804 at receive circuitry 320 (FIG. 3).

The method 1200 begins with operation 1202 with the baseband processor 110 calculating, accessing from memory, or otherwise obtaining post-SINR for specified sub-bands of the plurality of sub-bands. In some examples, the post-SINR is calculated for each RB of the specified sub-band, and in turn for each sub-band of the plurality of sub-bands.

The method 1200 continues with operation 1204 with the baseband processor 110 setting the current CQI index $i_{CQI}$ and feedback CQI index $i_{feedback}$ to 1. Here, $i_{CQI}$ and $i_{feedback}$ are both the indexes of CQI. In operation 1206, for a specific CQI index $i_{CQI}$, the baseband processor 110 retrieves the corresponding training set for the respective CQI. In operation 1208, the baseband processor 110 finds the k-NNs from $i_{CQI}$ training data and calculates the error rate based on every neighbors' CRC result. In operation 1210, the baseband processor 110 compares the calculated error rate with a threshold. If the error rate is less than the threshold, meaning the reliability constraint is satisfied, the baseband processor 110 continues with operation 1212 by comparing $i_{CQI}$ with $i_{feedback}$. If $i_{CQI}$ is larger, the baseband processor 110 increments index $i_{CQI}$ in operation 1214. Otherwise, if $i_{CQI}$ is not larger, the baseband processor 110 sets the feedback CQI index $i_{feedback}$ to $i_{CQI}$ in operation 1216. If the error rate was determined to not be less than the threshold in operation 1210, the baseband processor 110 performs only operation 1214 (incrementing index $i_{CQI}$) and does not compare $i_{CQI}$ with $i_{feedback}$.

The method 1200 continues with the baseband processor performing operation 1218 by checking whether $i_{CQI}$ is larger than $n_{CQI}$. If $i_{CQI}$ is larger than $n_{CQI}$, the baseband processor 110 proceeds with operation 1220 by setting the label of post-SINR at the CQI value with index $i_{feedback}$. Otherwise the baseband processor 110 starts over at operation 1206. In operation 1222, once all post-SINRs have been determined to be labeled, method 1200 is considered complete. Otherwise, the baseband processor 110 continues with further processing by resuming at operation 1202. After the processing of method 1200 is complete, the labeled post-SINR values are provided within the block diagram of FIG. 13.

Figure 13:
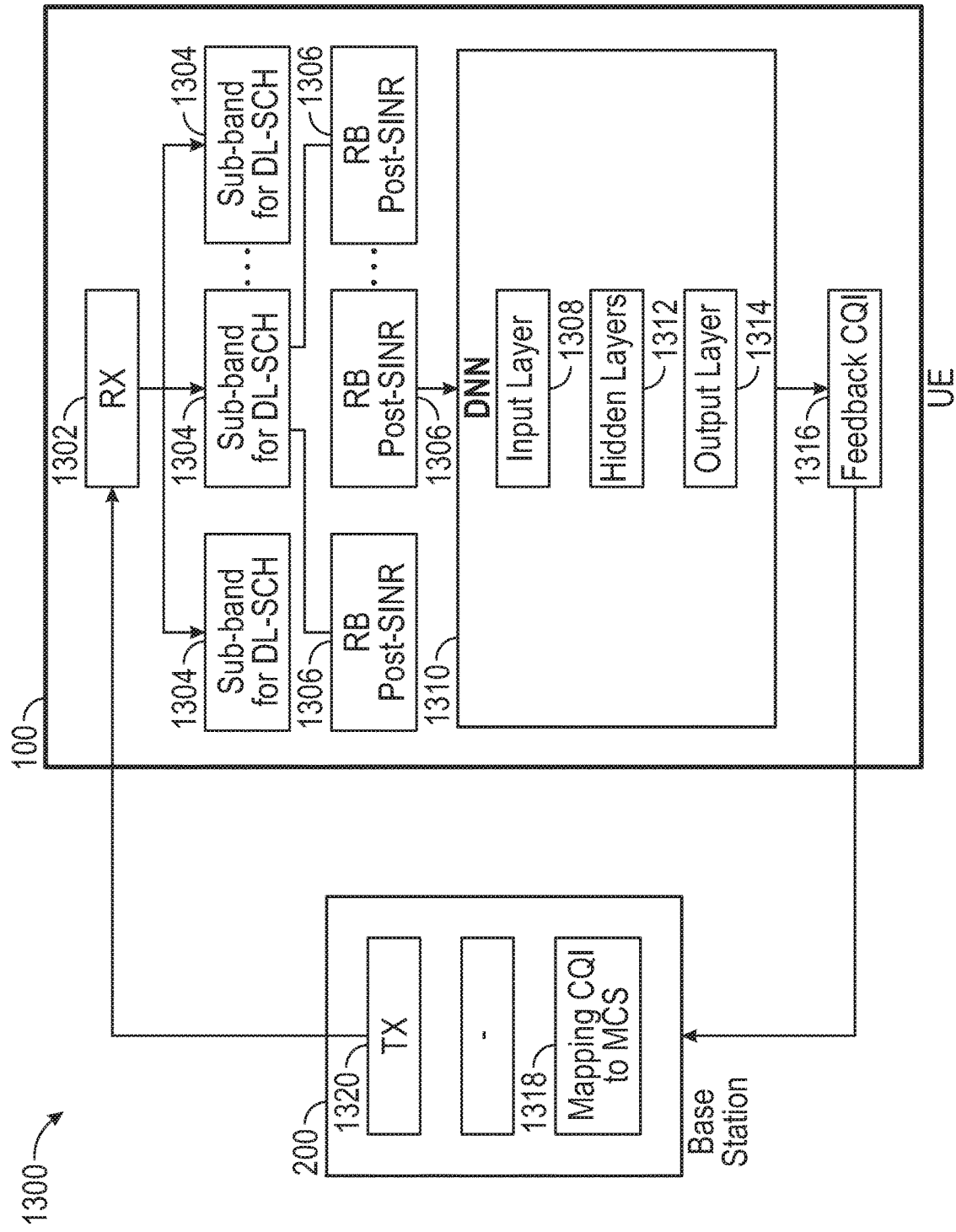
FIG. 13 is a block diagram for illustrating integration of deep neural networks (DNN) into link adaptation according to some aspects.

Referring to FIG. 13, at block 1302, the user device 100 receives signals on a plurality of sub-bands 1304 at receive circuitry 320 (FIG. 3). At blocks 1306, baseband processor 110 (FIG. 1) calculates (or accesses in memory or otherwise obtains) post-SINR for specified sub-bands of the plurality of sub-bands. Labeled post-SINR (such as determined according to the method of FIG. 12) can be provided to input layer 1308 of DNN 1310.

The DNN 1310 also includes hidden layers 1312 and an output layer 1314. The hidden layers model of DNN typically includes at least two hidden layers, with more hidden layers to support additional feature spaces. The hidden layers are connected and, for each hidden layer, there are many neurons. The types of neuron can include Rectified Linear Units (ReLU), Sigmoid, Tanh, etc. Weights W and biases b of the hidden layers and output layers can be retrieved from and saved to memory, for example SSD/Shared RAM 502 (FIG. 5). The NN can be a multilayer perceptron NN.

The hidden layers 1312 output will be the input of the output layer 1314. The output layer 1314 outputs the final CQI classification. In aspects, the output layer 1314 implements a softmax function, so each component of output indicates the probability of choosing one CQI value. The CQI with highest probability (e.g., the CQI associated with the label having the highest value) is selected as the feedback CQI for link adaptation.

In some aspects, the DNN 1310 includes two hidden layers (h1, h2) with 256 neurons in each layer, with ReLU neurons. The output layer 1314 can implement the softmax model. Link adaptation is conducted according to the below:

$$y_{h1} = \text{ReLU}(xW_{h1} + b_{h1})$$

$$y_{h2} = \text{ReLU}(y_{h1}W_{h2} + b_{h2})$$

$$y = y_{h2}W_{out} + b_{out}$$

$$y\_ = \text{softmax}(y).$$

$$\text{feedback } CQI = \text{argmax}(y\_)$$

Where $y_{h1}$ and $y_{h2}$ are outputs of first and second hidden layers 1312, respectively; x is the input from input layer 1308; $W_{h1}$ and $W_{h2}$ are weight of the first and second hidden layers, respectively; $b_{h1}$ and $b_{h2}$ are the biases of the first and second hidden layers, respectively; and $W_{out}$ and $b_{out}$ are weight and bias of the output layer 1314.

At block 1316, the baseband processor 110 provides the CQI and lowest error rate for transmission (e.g., to transmit circuitry 315 (FIG. 3)) to the base station. At block 1318, the base station 200 maps the feedback CQI to an MCS according to 3GPP standards or other family of standards, and then uses that MCS for future downlink transmissions at block 1320.

When user devices 100 have implemented method 1300, according to aspects, each sub-band of the DL-SCH will have reported a CQI and a corresponding error rate value. The sub-band having the largest CQI will be selected for transmission, and if two or more sub-bands both have the largest CQI, the sub-band with the lowest rate will be selected.

Artificial Intelligence for Rank Selection

As described earlier herein, link adaptation processes use feedback downlink channel quality metrics to enable error-free transmission (or target 10% Block Error Rate (BER)) on the downlink at maximum data throughput for a given resource allocation. In addition to the CQI discussed earlier herein, these feedback downlink channel quality metrics may further include a rank indicator (RI) and a precoding matrix indicator (PMI). By the CQI, the transmitter (e.g., the base station described in FIG. 2) selects one of several modulation alphabets and code rate combinations (e.g., MCSs). The RI informs the transmitter about the number of useful transmission layers for the current multiple-input multiple-output (MIMO) channel, and the PMI indicates the codebook index of the precoding matrix (depending on the number of transmit antennas) that is applied at the transmitter.

In order to identify an optimum set of CQI, RI, and PMI to report back to the transmitter, a user device 100 may perform a brute force search over various combinations of CQI, RI and PMI. One brute force search algorithm, which may be performed by baseband processor 110 (FIG. 1) can include whitening a channel (H) at sampled frequency intervals using a whitening matrix (W) to generate whitened channel samples. The baseband processor 110 may then normalize the whitened channel (WH) to unity noise covariance. Next, the baseband processor 110 precodes each whitened channel (WH) using a set of precoders from the codebook for each rank to generate an effective channel matrix (WHP). Next, the baseband processor 110 determines the per-layer SINR of the aggregated effective channel. From the per-layer SINR, the baseband processor 110 estimates theoretical channel capacity and maps the theoretical channel capacity to mutual information (MI) based on various modulation schemes. Channel capacity or MI can then be aggregated. Finally, the baseband processor 110 compares the MI calculations for various ranks and precoders to make optimal RI and PMI selections and determine CQI values.

Such a brute force search may be memory-intensive and computationally expensive. Aspects provide NN-based algorithms to reduce or eliminate the need for such brute force search. According to some aspects, a NN (or deep NN (DNN)) is trained to learn the mapping between a channel covariance matrix and RI. The NN then provides an inference on the optimal RI. By selecting the RI using the NN, the search space for the optimal PMI/CQI is constrained to a particular rank hypothesis, which can enable faster searching (relative to the brute force searching described above).

Figure 14:
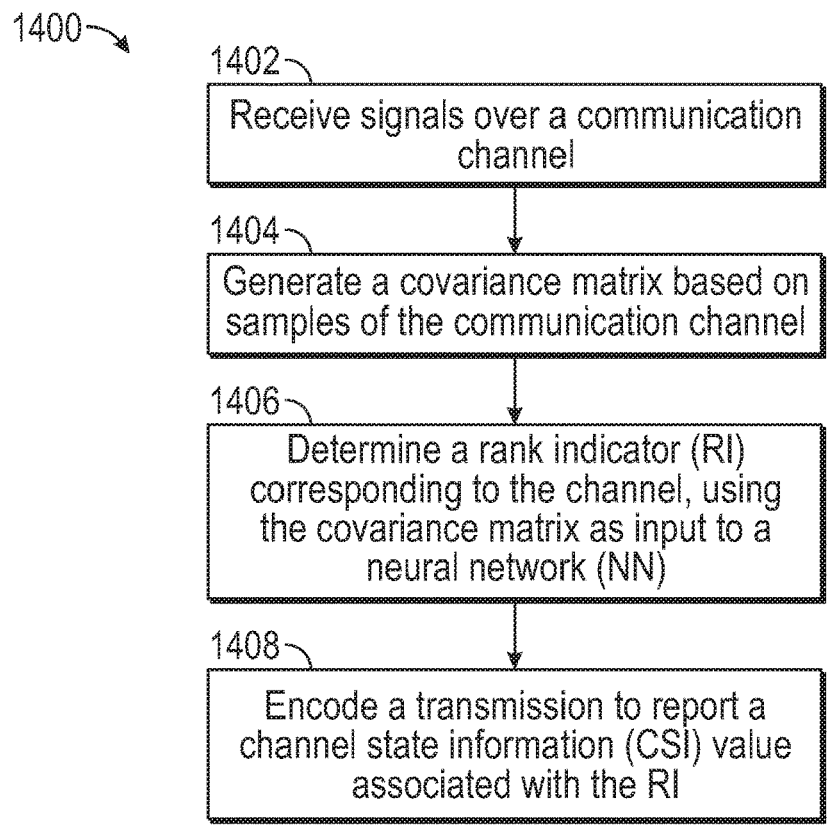
FIG. 14 is a flowchart of a method for identifying feedback parameters to report to a base station in a link adaptation process, according to some aspects.

FIG. 14 is a flowchart of a method 1400 for identifying feedback parameters to report to a base station in a link adaptation process, according to some aspects. Components of a user device 100 (FIG. 1), such as receive circuitry 320 (FIG. 3) and baseband processor 110 (FIG. 1), can implement some operations of method 1400.

The method 1400 begins with operation 1402 with the receive circuitry 320 receiving signals over a communication channel. The baseband processor 110 generates covariance matrix based on samples of the communication channel. The baseband processor 110 may generate the covariance matrix according to the block diagram shown in FIG. 15.

Figure 15:
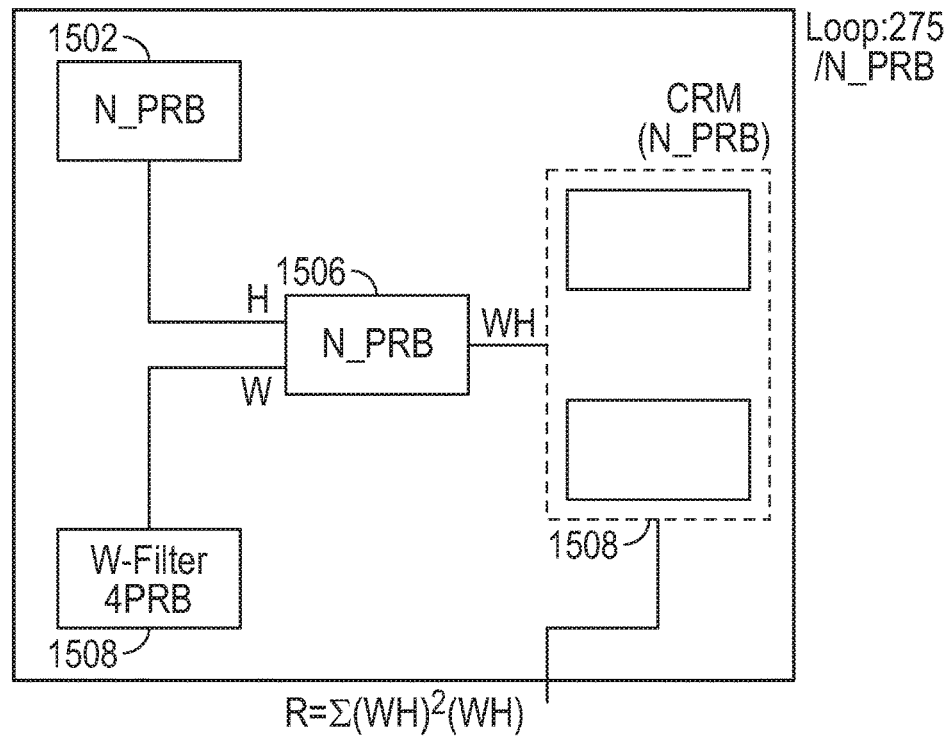
FIG. 15 is a block diagram for illustrating generation of the channel covariance matrix according to some aspects.

FIG. 15 is a block diagram for illustrating generation of the channel covariance matrix according to some aspects. Block 1502 shows input of communication channel (H), which can include a number of physical resource blocks (PRBs) N_PRB. The user device 100 samples H at specified frequency intervals. Filter 1504 provides a whitening matrix (W).

At block 1506, the baseband processor 110 whitens the channel H (or channel samples) using W to generate whitened channel (WH) samples and normalizes WH to unity noise covariance to generate normalized channel samples. At 1508, the baseband processor 110 multiplies the normalized channel samples by its Hermitian matrix and then aggregates the result of that multiplication to the last sampled frequency. The operations of blocks 1502, 1504, 1506 and 1508 are repeated across the bandwidth of sampled channels. For example, operations of blocks 1502, 1504, 1506 and 1508 can be repeated 275/N_PRB times (where N_PRB is the decimation factor expressed in units of physical resource blocks (PRBs) and 275 is a hypothetical number of PRBs across the bandwidth) and, as a result, the baseband processor 110 generates a covariance matrix R based on samples of the communication channel. In aspects, the covariance matrix R includes respective values corresponding to each sub-band of the communication channel. The matrix R may have dimensions Rx*Rx, where Rx is the receive antenna array size. It will be further noted that Tx is greater than or equal to Rx, where Tx is the transmit antenna array size.

Referring again to FIG. 14, the method continues with operation 1406, in which the baseband processor 110 determines an RI corresponding to the channel, using the covariance matrix R as input to a NN or DNN. In operation 1408, the baseband processor 110 encodes a transmission to report a channel state information (CSI) value associated with the RI. In some aspects, the baseband processor 110 uses the RI to constrain a search for at least one of a CQI and a PMI. The CSI value provided in operation 1408 may then include one or both of the CQI and PMI.

The covariance matrix R can also be used in some aspects to generate training sets to train the NN or DNN. In some aspects, the WH matrices described above with respect to FIG. 15 (and particularly with respect to block 1506) are passed through the brute force search algorithm described earlier herein to generate the RI observation. Each {R, RI} pair generated by the brute force search algorithm is used as a sample for training or evaluating the performance of the NN or DNN. In some aspects, a variety of channel models (for example, millimeter wave models, extended pedestrian A (EPA) models, extended vehicular A (EVA) models, and extended typical urban (ETU) models, and other models) may be used for training. In some aspects, training can be performed offline using the various channel models, and results stored as weights and biases for the NN or DNN for real-time use by the user device 100 in performing method 1400.

Other Apparatuses, Systems and Methods

Figure 16:
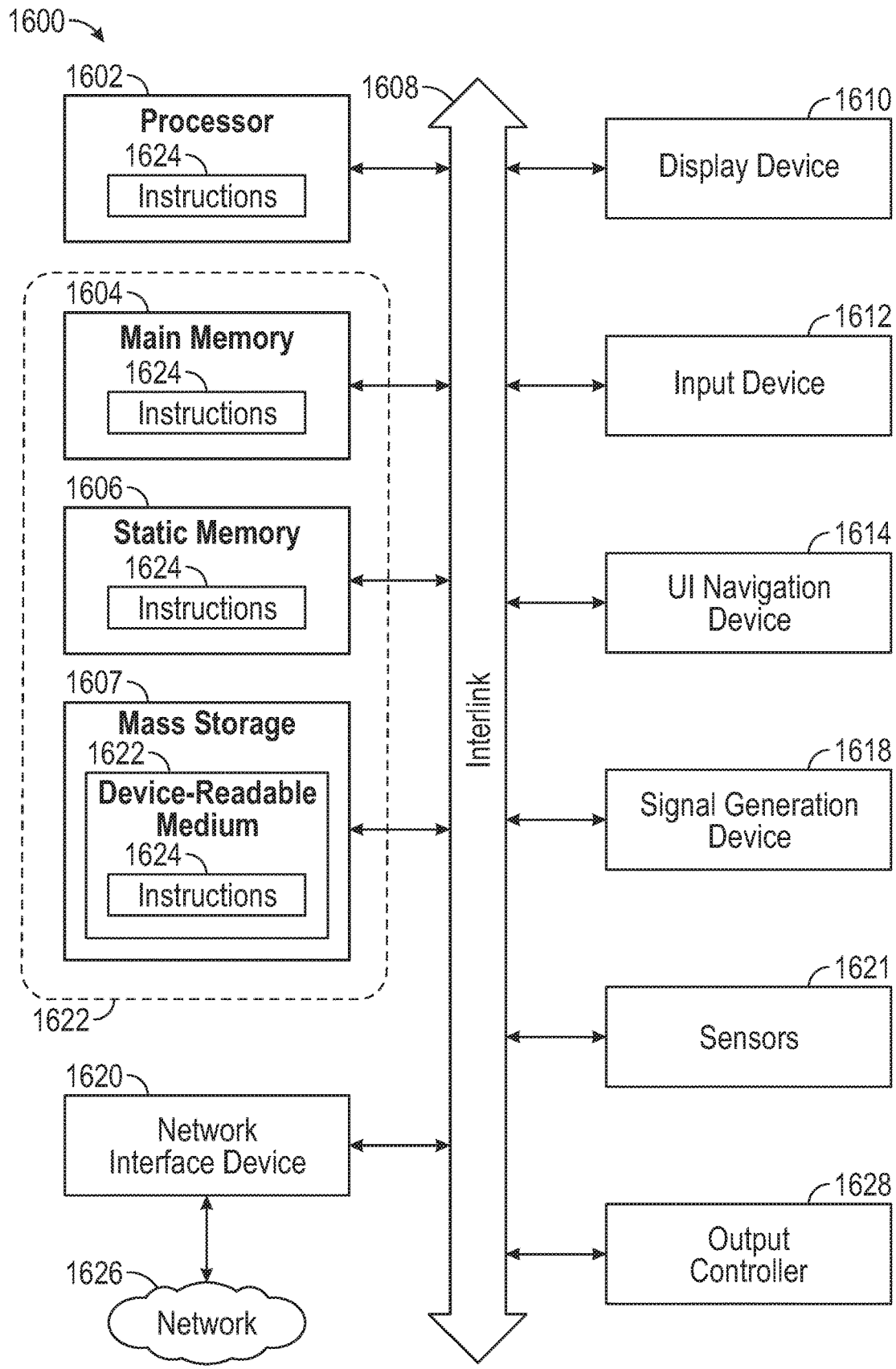
FIG. 16 is a block diagram illustrating an example of a machine upon which one or more aspects may be implemented.

FIG. 16 illustrates a block diagram of an example machine 1600 upon which any one or more of the techniques (e.g., methodologies) discussed herein may perform, for example, machine learning-based methods for link adaptation.

Examples, as described herein, may include, or may operate by, logic or a number of components, or mechanisms in the machine 1600. Circuitry (e.g., processing circuitry) is a collection of circuits implemented in tangible entities of the machine 1600 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1600 follow.

In alternative aspects, the machine 1600 may operate as a standalone device or may be connected (e.g., networked) to other machines. In a networked deployment, the machine 1600 may operate in the capacity of a server machine, a client machine, or both in server-client network environments. In an example, the machine 1600 may act as a peer machine in peer-to-peer (P2P) (or other distributed) network environment. The machine 1600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1600 may include a hardware processor 1602 (e.g., a central processing unit (CPU), a graphics processing unit (GPU), a hardware processor core, or any combination thereof), a main memory 1604, a static memory (e.g., memory or storage for firmware, microcode, a basic-input-output (BIOS), unified extensible firmware interface (UEFI), etc.) 1606, and mass storage 1608 (e.g., hard drive, tape drive, flash storage, or other block devices) some or all of which may communicate with each other via an interlink (e.g., bus) 1630. The machine 1600 may further include a display unit 1610, an alphanumeric input device 1612 (e.g., a keyboard), and a user interface (UI) navigation device 1614 (e.g., a mouse). In an example, the display unit 1610, input device 1612 and UI navigation device 1614 may be a touch screen display. The machine 1600 may additionally include a storage device (e.g., drive unit) 1608, a signal generation device 1618 (e.g., a speaker), a network interface device 1620, and one or more sensors 1616, such as a global positioning system (GPS) sensor, compass, accelerometer, or other sensor. The machine 1600 may include an output controller 1628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1602, the main memory 1604, the static memory 1606, or the mass storage 1608 may be, or include, a machine readable medium 1622 on which is stored one or more sets of data structures or instructions 1624 (e.g., software) embodying or utilized by any one or more of the techniques or functions described herein. The instructions 1624 may also reside, completely or at least partially, within any of registers of the processor 1602, the main memory 1604, the static memory 1606, or the mass storage 1608 during execution thereof by the machine 1600. In an example, one or any combination of the hardware processor 1602, the main memory 1604, the static memory 1606, or the mass storage 1608 may constitute the machine readable media 1622. While the machine readable medium 1622 is illustrated as a single medium, the term "machine readable medium" may include a single medium or multiple media (e.g., a centralized or distributed database, and/or associated caches and servers) configured to store the one or more instructions 1624.

The term "machine readable medium" may include any medium that is capable of storing, encoding, or carrying instructions for execution by the machine 1600 and that cause the machine 1600 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1624 may be further transmitted or received over a communications network 1626 using a transmission medium via the network interface device 1620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1620 may include one or more physical jacks (e.g., Ethernet, coaxial, or phone jacks) or one or more antennas to connect to the communications network 1626. In an example, the network interface device 1620 may include a plurality of antennas to wirelessly communicate using at least one of single-input multiple-output (SIMO), MIMO, or multiple-input single-output (MISO) techniques. The term "transmission medium" shall be taken to include any intangible medium that is capable of storing, encoding or carrying instructions for execution by the machine 1600, and includes digital or analog communications signals or other intangible medium to facilitate communication of such software. A transmission medium is a machine readable medium.

EXAMPLES

Although an aspect has been described with reference to specific example aspects, it will be evident that various modifications and changes may be made to these aspects without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, by the term "aspect" merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects, and other aspects not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus, the following claims are hereby incorporated into the Detailed Description, with each claim standing on its own as a separate aspect.

The following describes various examples of methods, machine-readable media, and systems (e.g., machines, devices, or other apparatus) discussed herein.

Example 1 is an apparatus comprising receive circuitry configured to receive signals on a plurality of sub-bands; processing circuitry coupled to the receive circuitry, the processing circuitry configured to calculate a signal to interference and noise ratio (SINR) value of a specified sub-band of the plurality of sub-bands; determine k-nearest neighbors based on training data associated with the specified sub-band and on the calculated SINR value; determine error rates for the k-nearest neighbors to determine a lowest error rate for the k-nearest neighbors; identify a channel quality indicator (CQI) associated with the lowest error rate; and provide, for transmission to a base station, the CQI and lowest error rate.

In Example 2, Example 1 further includes wherein the SINR value is calculated for each resource block (RB) of the specified sub-band.

In Example 3, Example 2 further includes wherein the processing circuitry is further configured to sort the SINR values of the RBs in descending order; and determine the k-nearest neighbors based on the sorted SINR values.

In Example 4, any of Examples 1-3 further include wherein the training data includes two or more of a previous SINR value for each sub-band, a previous error result for each sub-band, traffic block size, a modulation coding scheme (MCS) associated with the CQI, and a block error rate (BLER).

In Example 5, any of Examples 1-4 further include local link adaptation circuitry to retrieve the training data from memory and provide the training data corresponding to a specified CQI to the processing circuitry.

In Example 6, any of Examples 1-5 further include wherein the processing circuitry is further configured to determine a cyclic redundancy check (CRC) result based on the SINR value and the k-nearest neighbors and wherein the error rate is determined based on the CRC result.

In Example 7, Example 6 can further include wherein the processing circuitry is further configured to, in response to a determination the error rate is less than a threshold, update the identified CQI to a current CQI if the current CQI is greater than the identified CQI.

In Example 8, Example 7 can further include wherein the operations are performed for each sub-band of a downlink shared channel (DL-SCH) received from the base station.

In Example 9, any of Examples 1-8 can further include wherein the processing circuitry is further configured to encode a transmission using a modulation and coding scheme (MCS) associated with the CQI with the lowest error rate.

In Example 10, an apparatus comprises receive circuitry configured to receive wireless communications; and processing circuitry coupled to the receive circuitry and configured to calculate a post-signal-to-noise ratio (SINR) value for a sub-band of the wireless communications; determine, using a neural network (NN) and the post-SINR value as input to the NN, a label for each of a plurality of channel quality indicators (CQIs) that indicates probability of choosing a respective CQI of the plurality of CQIs; and encode a transmission that indicates the CQI of the plurality of CQIs associated with the label having the highest value.

In Example 11, Example 10 can further include wherein the post-SINR value is calculated for each resource block (RB) of a specified sub-band and the post-SINR values of RBs of the sub-band are the input to the NN.

In Example 12, Example 11 can further include wherein the NN is a multilayer perceptron NN, and the neurons include rectified linear units.

In Example 13, any of Examples 10-12 can further include wherein the processing circuitry is further configured to preprocess training data using a k-nearest neighbor.

In Example 14, Example 13 can further include wherein preprocessing the training data includes, receiving, for each RB of a sub-band, a post-SINR value, determining the k-nearest neighbors to the post-SINR values, determining an error rate based on a cyclic redundancy check (CRC) value of the k-nearest neighbors and the post-SINR values, and associating a higher valued label with a CQI associated with a lower error rate than a CQI associated with a higher error rate.

In Example 15, Example 14 can further comprise memory, and the processing circuitry is further configured to train the NN using the training data and store the weights and biases produced from the training in the memory.

In Example 16, any of Examples 10-15 can further include wherein the NN is a deep NN (DNN).

In Example 17, Example 16 can further include wherein the DNN includes an input layer that receives a post-SINR value for each RB of a sub-band of a communication from a base station, one or more hidden layers, and an output layer that indicates probability of choosing a respective CQI value.

In Example 18, any of Examples 10-17 can further include wherein the operations are performed for each sub-band of a downlink shared channel (DL-SCH) received from a base station.

In Example 19, an apparatus comprises receive circuitry to receive signals over a communication channel; and processing circuitry coupled to the receive circuitry and configured to generate a covariance matrix based on samples of the communication channel; determine a rank indicator (RI) corresponding to the communication channel, using the covariance matrix as input to a neural network (NN); and encode a transmission to report a channel state information (CSI) value associated with the RI.

In Example 20, Example 19 can further include wherein the processing circuitry is further configured to use the RI to constrain a search for at least one of a channel quality indicator (CQI) and a precoding matrix indicator (PMI).

In Example 21, Example 20 can further include wherein the CSI value further includes at least one of the CQI and PMI.

In Example 22, any of Examples 19-21 can further include wherein generating the covariance matrix includes whitening samples of the communication channel to generate whitened channel samples.

In Example 23, Example 22 can further include wherein generating the covariance matrix further includes normalizing the whitened channel samples to unity noise covariance to generate normalized channel samples.

In Example 24, Example 23 can further include wherein generating the covariance matrix further includes multiplying the normalized channel samples by a Hermitian matrix.

In Example 25, any of Examples 19-24 can further include wherein the covariance matrix includes respective values corresponding to each sub-band of the communication channel.

What is claimed is:

1. An apparatus comprising:
   receive circuitry configured to receive wireless communications; and
   processing circuitry coupled to the receive circuitry and configured to:
   calculate a post-signal-to-noise ratio (SINR) value for a sub-band of the wireless communications;
   determine, using a neural network (NN) and the post-SINR value as input to the NN, a label for each of a plurality of channel quality indicators (CQIs) that indicates probability of choosing a respective CQI of the plurality of CQIs; and
   encode a transmission that indicates the CQI of the plurality of CQIs associated with the label having the highest value.

2. The apparatus of claim 1, wherein the post-SINR value is calculated for each resource block (RB) of the sub-band and the post-SINR value for each RB are the input to the NN.

3. The apparatus of claim 2, wherein the NN is a multilayer perceptron NN, and neurons of the multilayer perceptron NN include rectified linear units.

4. The apparatus of claim 1, wherein the processing circuitry is further configured to:
   preprocess training data using a k-nearest neighbor.

5. The apparatus of claim 4, wherein the preprocessing the training data includes, receiving, for each resource block (RB) of a sub-band, a post-SINR value, determining the k-nearest neighbors to the post-SINR value for each RB, determining an error rate based on a cyclic redundancy check (CRC) value of the k-nearest neighbors and the post-SINR value for each RB, and associating a higher valued label with a CQI associated with a lower error rate than a CQI associated with a higher error rate.

6. The apparatus of claim 5, further comprising a memory, and wherein the processing circuitry is further configured to:
   train the NN using the training data and store the weights and biases produced from the training in the memory.

7. The apparatus of claim 1, wherein the NN is a deep NN (DNN).

8. The apparatus of claim 7, wherein the DNN includes an input layer that receives a post-SINR value for each RB of a sub-band of a communication from a base station, one or more hidden layers, and an output layer that indicates probability of choosing a respective CQI value.

9. The apparatus of claim 1, wherein the calculate, the determine and the encode are performed for each sub-band of a downlink shared channel (DL-SCH) received from a base station.

* * * * *